(12) United States Patent
Lee et al.

(10) Patent No.: US 8,202,660 B2
(45) Date of Patent: Jun. 19, 2012

(54) FUEL CELL SYSTEM INCLUDING FUEL PROCESSOR AND MANAGING METHOD THEREOF

(75) Inventors: Hyun-chul Lee, Hwaseong-si (KR); Kang-hee Lee, Yongin-si (KR); Doo-hwan Lee, Suwon-si (KR); Jin S. Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/238,494

(22) Filed: Sep. 21, 2011

(65) Prior Publication Data

US 2012/0009488 A1 Jan. 12, 2012

Related U.S. Application Data

(62) Division of application No. 12/100,609, filed on Apr. 10, 2008, now Pat. No. 8,043,751.

(30) Foreign Application Priority Data

Oct. 19, 2007 (KR) .............................. 2007-105788

(51) Int. Cl.
*H01M 8/04* (2006.01)
*H01M 8/06* (2006.01)
(52) U.S. Cl. .................... 429/429; 429/412; 429/435
(58) Field of Classification Search .................. 429/429, 429/412, 435
See application file for complete search history.

(56) References Cited

U.S. PATENT DOCUMENTS

| | | | |
|---|---|---|---|
| 6,086,839 A | | 7/2000 | Autenrieth et al. |
| 6,797,418 B1 * | | 9/2004 | Nomura et al. ............... 429/408 |
| 2003/0010629 A1 * | | 1/2003 | St-Pierre et al. .............. 204/253 |
| 2003/0170510 A1 * | | 9/2003 | Robb et al. ....................... 429/17 |
| 2006/0133993 A1 * | | 6/2006 | Dieckmann et al. .......... 423/651 |
| 2006/0159970 A1 | | 7/2006 | Kato et al. |
| 2007/0087236 A1 | | 4/2007 | Komachiya et al. |
| 2007/0111052 A1 | | 5/2007 | Takagi |

FOREIGN PATENT DOCUMENTS

| | | |
|---|---|---|
| EP | 1703577 | 9/2006 |
| JP | 2002-216824 | 8/2002 |
| JP | 2006032269 | 2/2006 |

OTHER PUBLICATIONS

U.S. Appl. No. 12/100,609, filed Apr. 10, 2008, Lee et al., Samsung Electronics Co. Ltd.

* cited by examiner

*Primary Examiner* — Gregg Cantelmo
(74) *Attorney, Agent, or Firm* — Stein McEwen, LLP

(57) ABSTRACT

A fuel cell system including a fuel processor, and a method of operating the fuel cell system, the fuel cell system includes: a reformer that reforms a hydrocarbon group fuel source into a reformed gas; a burner that heats the reformer; a CO remover unit that removes CO from a reformed gas generated by the reformer; a stack to generate electricity using the reformed gas; a first burner fuel supply line to supply the hydrocarbon group fuel source to the burner; and a second burner fuel supply line to supply the reformed gas from the CO remover unit to the burner.

3 Claims, 5 Drawing Sheets

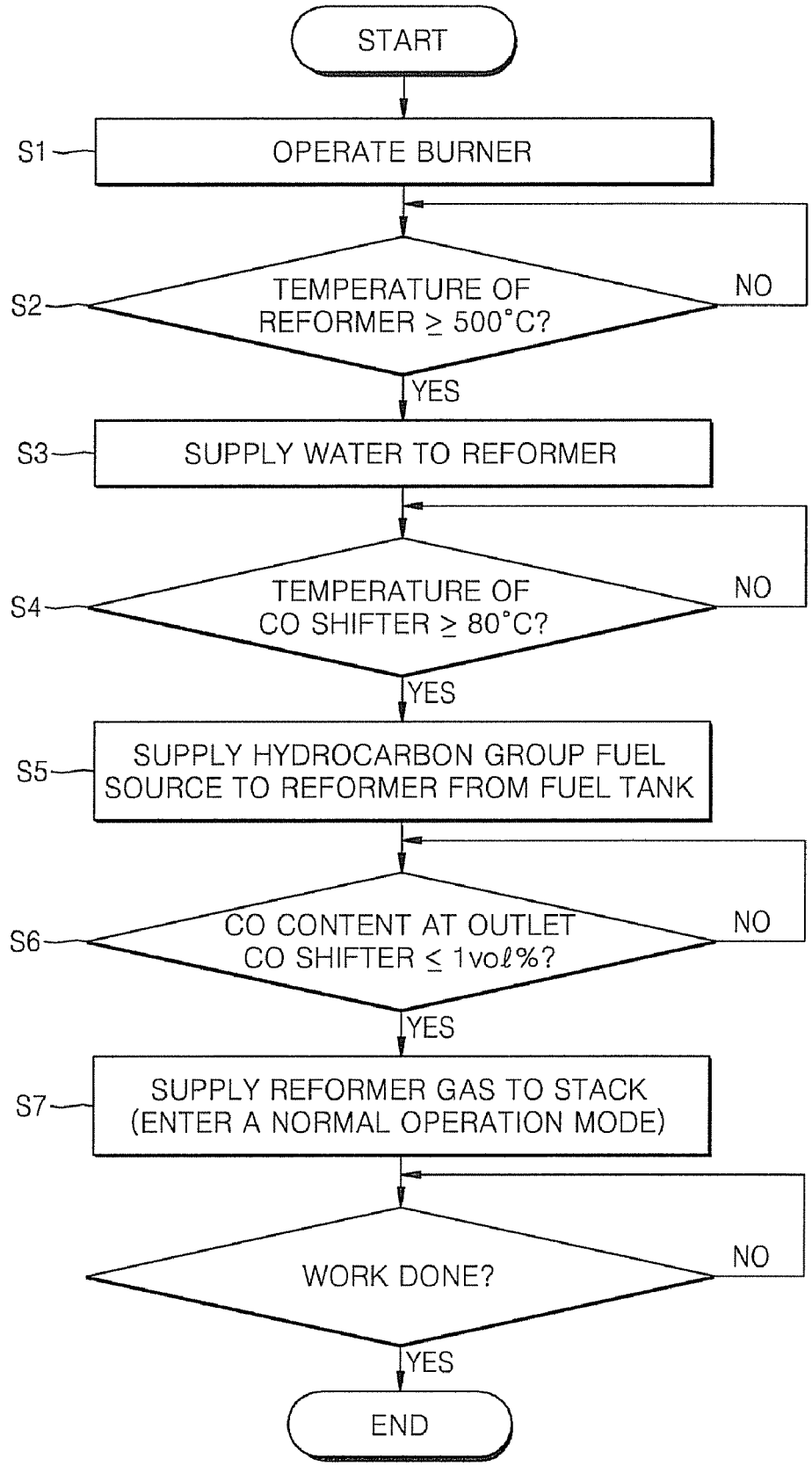

FUEL CELL SYSTEM INCLUDING FUEL PROCESSOR AND MANAGING METHOD THEREOF

CROSS-REFERENCE TO RELATED APPLICATIONS

This application is a divisional of U.S. patent application Ser. No. 12/100,609, filed Apr. 10, 2008, now U.S. Pat. No. 8,043,751, issued Oct. 25, 2011, which claims the benefit of Korean Patent Application No. 2007-105788, filed on Oct. 19, 2007, in the Korean Intellectual Property Office, the disclosure of which is incorporated herein in its entirety by reference.

BACKGROUND OF THE INVENTION

1. Field of the Invention

Aspects of the present invention relate to a fuel cell system that includes a fuel processor, and a method of operating the fuel cell system.

2. Description of the Related Art

A fuel processor generally has a configuration in which, after reforming a hydrocarbon group fuel source, into a reformed gas suitable for use on electricity generation reaction in a fuel processor, the reformed gas is supplied to an anode of a stack of a fuel cell system, to drive the electricity generation reaction.

When a fuel is reformed in a fuel processor, the fuel undergoes a series of processes, such as, a desulphurization process, in which sulfur components in the fuel source are reduced, a reforming process, in which the fuel source is reformed to a hydrogen-rich gas, and a CO removing process, in which CO produced as a by-product in the reforming process is removed. The reformed hydrogen-rich gas (also referred to as a reformed gas) is supplied to an anode of the stack. Then, an electricity generation reaction occurs in the stack, between the reformed gas supplied to the anode, and air (oxygen) supplied to a cathode.

In order to efficiently operate a fuel cell system, it is necessary to rapidly increase an initial start-up temperature. In particular, in the reforming process and the CO removing process, if the temperature is not above a suitable level, a desired reaction result is not obtained. Thus, in order to rapidly operate the fuel cell system in a normal operation mode, it is necessary to be able to rapidly produce a reformed gas, through a rapid temperature increase at the initial start-up. The reformed gas output from the fuel processor, before a normal operation is reached, cannot be supplied to the stack, or discharged to the outside, and thus, a method of treating the reformed gas must be provided.

Therefore, a fuel cell system must be manufactured to have a structure that can be efficiently operated, in consideration of the above matters.

SUMMARY OF THE INVENTION

Aspects of the present invention provide a fuel cell system, in which a fuel processor and a stack can be rapidly and efficiently operated, and a method of operating the fuel cell system.

According to an aspect of the present invention, there is provided a fuel cell system comprising: a reformer that performs a reforming reaction of a fuel source; a burner that heats the reformer; a CO remover unit that removes CO from a reformed gas generated by the reformer; a stack in which an electricity generation reaction, using the reformed gas, is performed; a first burner fuel supply line to supply the fuel source to the burner; and a second burner fuel supply line to supply the reformed gas from the CO remover unit, to the burner.

According to aspects of the present invention, the fuel cell system may further comprise a third burner fuel supply line to supply an anode off gas, which is a surplus reformed gas from the stack, to the burner. The second burner fuel supply line and the third burner fuel supply line may be connected to each other, so that the second burner fuel supply line, or the third burner fuel supply line, can be selected by a first valve, to thereby supply a fuel to the burner.

According to aspects of the present invention, the fuel cell system may further comprise first and second heat exchangers to preheat water that is conveyed to the reformer, by absorbing heat from an exhaust gas from the burner, and the heat from the reformed gas from the reformer.

According to aspects of the present invention, the fuel cell system may further comprise a warm water conveying line that conveys the water heated by the reformer, to a warm water storage, through the second heat exchanger. The fuel cell system may further comprise a second valve that controls the transport of warm water to the warm water storage, from the reformer, through the warm water conveying line, and controls the transport of the reformed gas to the CO remover unit, from the reformer.

According to aspects of the present invention, the CO remover unit may comprise a CO shifter and a CO remover, and the second burner fuel supply line may be branched between an outlet of the CO shifter and an outlet of the CO remover.

According to another aspect of the present invention, there is provided a method of operating a fuel cell system, comprising: heating a reformer using a burner; supplying water to the reformer, when the temperature of the reformer reaches a first set temperature; performing a reformer reaction, by supplying a fuel source to the reformer, when the temperature of the CO remover unit reaches a second set temperature; supplying a reformed gas that has passed through the CO remover unit, to the burner, as a fuel for operating the burner, until the CO content in the reformed gas is reduced to set content, or less; and supplying the reformed gas that has passed through the CO remover unit, to a stack, when the CO content in the reformed gas is sufficiently reduced.

According to aspects of the present invention, the method may further comprise supplying an anode off gas, which is surplus gas coming out of the stack, to the burner. The method may further comprise conveying water heated in the reformer, to a warm water storage, until the temperature of the CO remover unit reaches a second set temperature.

According to aspects of the present invention, the first set temperature may be 500° C., the second set temperature may be 80° C., and the set CO content may be 1 vol %.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated, from the following description of the exemplary embodiments, taken in conjunction with the accompanying drawings, of which:

FIG. 3 is a flow chart showing a start-up operation of the fuel cell system of FIG. 1, according to an exemplary embodiment of the present invention.

DETAILED DESCRIPTION OF THE EMBODIMENTS

Figure 1:
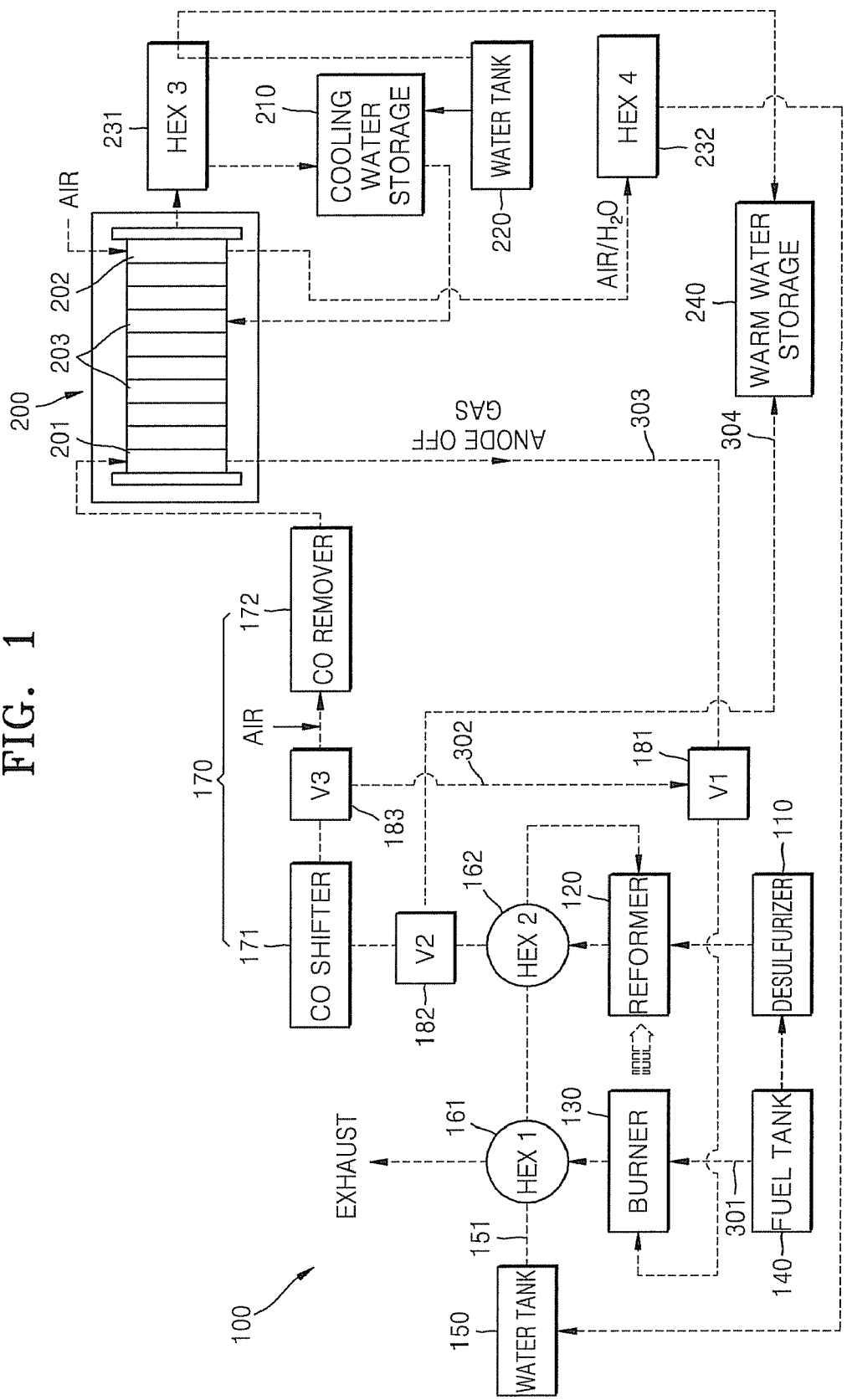
FIG. 1 is a block diagram of a fuel cell system, according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a fuel cell system, according to an exemplary embodiment of the present invention. Referring to FIG. 1, the fuel cell system includes: a stack 200 that performs an electricity generation reaction; and a fuel processor 100 that reforms hydrocarbon group fuel source into a reformed fuel.

The fuel processor 100 includes a desulfurizer 110, a reformer 120, a burner 130, first and second heat exchangers 161 and 162, and a CO remover unit 170. The CO remover unit 170 comprises a CO shifter 171 and a CO remover 172. The process of reforming the hydrocarbon group fuel source is performed in the reformer 120. That is, hydrogen is produced in the reformer 120, which is heated by the burner 130, through a reaction between the hydrocarbon group fuel source supplied from a fuel tank 140, and steam supplied from a water tank 150, through a water supply line 151. At this point, $CO_2$ and CO are produced as by-products.

If a fuel gas having a CO content of 10 ppm, or more, is supplied to the stack 200, electrodes therein are poisoned, and thus, the performance of fuel cells of the stack 200 can be rapidly reduced. Thus, the CO content in the fuel gas is reduced below 10 ppm, by disposing the CO shifter 171 and the CO remover 172 at an outlet of the reformer 120. In the CO shifter 171, a reaction of CO and steam, to produce $CO_2$, mainly occurs. In the CO remover 172, a reaction occurs to oxidize CO with oxygen. The CO content in the reformed gas that has passed through the CO remover unit 170, is thereby reduced below about 10 ppm.

The desulfurizer 110 is disposed at an inlet side of the reformer 120, and removes sulphur components from in the hydrocarbon group fuel source. If the reformed gas has a sulphur component of 10 ppb, or more, there is a high risk of poisoning the electrodes. Thus, the sulphur components in the hydrocarbon group fuel source are removed, by the desulfurizer 110. The first and second heat exchangers 161 and 162 heat water from the water tank 150, which then enters the reformer 120, through the water supply line 151. The heat exchanger 161 absorbs heat from an exhaust gas from the burner 130, and the heat exchanger 162 absorbs heat from the reformed gas exhausted from the reformer 120.

When the fuel cell system, having the fuel processor 100 and the stack 200, is operated in a normal operation mode, the reformed gas is produced by the fuel processor 100, and is supplied to the stack 200. An electricity generation reaction occurs in the stack 200, by reacting the reformed gas with an oxidant.

The burner 130 uses the hydrocarbon group fuel source, which is supplied from the fuel tank 140, through a first burner fuel supply line 301. The reformed gas that has passed through the CO remover unit 170 can also be used to operate the burner 130. The reformed gas can be supplied through a second burner fuel supply line 302 to the burner 130, from the CO remover unit 170. An anode off-gas, which is surplus reformed gas that is discharged from the anode 201 of the stack 200, can be also used as to operate the burner 130. The off-gas can be supplied to the burner 130, through a third burner fuel supply line 303. That is, the burner 130 can be operated using the fuels supplied through the three fuel supply lines 301, 302, and 303.

The burner 130 not only uses the hydrocarbon group fuel source supplied from the fuel tank 140, but also uses the reformed gas produced from the reformer 120. Methods of supplying the fuels to the burner 130, through the three fuel supply lines, will be described later. A first valve 181 controls the supply of a particular fuel to the burner 130, by selectively opening the second burner fuel supply line 303 or the third burner fuel supply line 303.

The fuel cell system includes a warm water conveying line 304 to supply water heated by the reformer 120, to a warm water storage 240. The water heated by the burner 130 at a start-up operation (before performing a normal operation) is sent to the warm water storage 240, to be put to other uses. A second valve 182 is provided on an outlet side of the second heat exchanger 162, and controls whether the warm water is transferred from the reformer 120 to the warm water storage 240, through the warm water conveying line 304, or to the CO remover unit 170.

The stack 200 includes stacked unit cells. Each unit cell includes an anode 201, to which the reformed gas is supplied, and a cathode 202, to which air (an oxygen source) is supplied. The stack 200 includes cooling plates 203 installed between several unit cells. Cooling water is circulated through the cooling plates 203, to absorb heat generated during the electricity generation reaction. In FIG. 1, for convenience of explaining, one anode 201 and one cathode 202 are depicted. However, in practice, a plurality of unit cells are employed, each including an anode 201, a cathode 202, and an electrolyte membrane (not shown) interposed therebetween. The cooling plates 203 are installed between every five to six unit cells.

The fuel cell system includes: a cooling water storage 210, to store cooling water received from a water tank 220; a third heat exchanger 231 to exchange heat absorbed by the cooling water from the stack 200, with the water of the water tank 220; and a fourth heat exchanger 232 that cools steam and air coming out from the cathode 202, using the water of the water tank 220. The cooled steam is sent to the water tank 150 of the fuel processor 100. The cooling water is circulated in the cooling plates 203 to cool the stack 200.

Figure 2A:
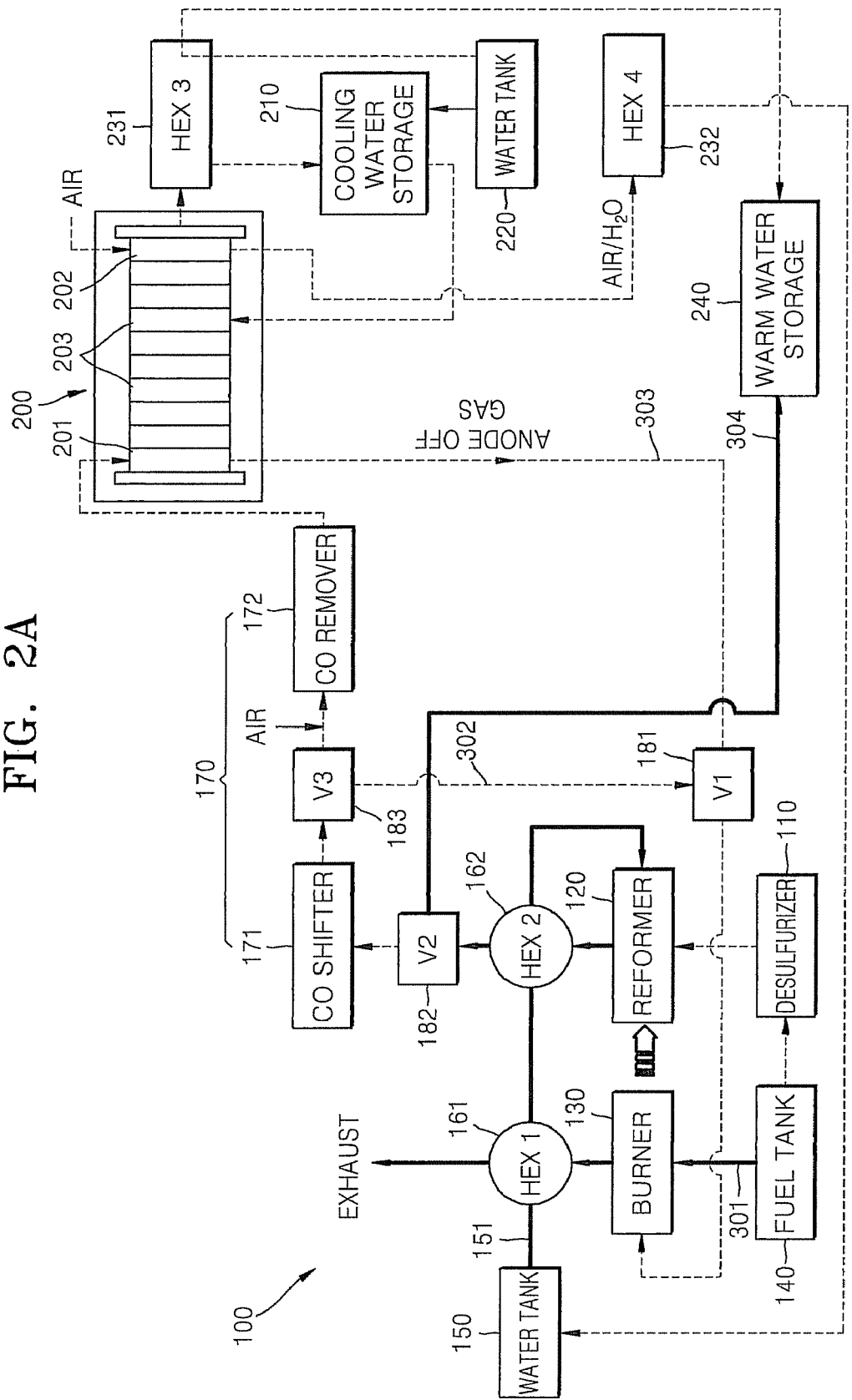
FIGS. 2A through 2C are block diagrams of operation modes of the fuel cell system of FIG. 1, according to exemplary embodiments of the present invention.

The fuel cell system having the above structure can be operated by a sequence shown in FIG. 3. In order to start-up the fuel cell system, the hydrocarbon group fuel source is supplied to the burner 130, from the fuel tank 140, through the first burner fuel supply line 301, to heat the reformer 120 (S1). When the temperature of the reformer 120 reaches a set temperature, for example, 500° C. (S2), water stored in the water tank 150 is supplied to the reformer 120, through the water supply line 151 (S3). At this time, the reformed fuel is not produced, since the hydrocarbon group fuel source is not supplied to the reformer 120. Thus, only water is heated in the reformer 120, which is heated by the burner 130. The heated water is transported from the reformer 120, to the warm water storage 240, through the warm water conveying line 304, under the control of the second valve 182 (refer to FIG. 2A).

The CO shifter 171 contacts the reformer 120, thus, the temperature of the CO shifter 171 is increased, when the reformer 120 is heated by the burner 130. The CO shifter 171 is heated to a set temperature, for example, 80° C., or above, in order that a CO removal reaction can be appropriately performed. Thus, when the temperature of the CO shifter 171 reaches at least 80° C. (S4), the hydrocarbon group fuel source in the fuel tank 140 is supplied to the reformer 120, through the desulfurizer 110 (S5). Thus, a reformer reaction is conducted, by which a reformed gas having hydrogen as a main component is produced, by reacting the hydrocarbon group fuel source and the water.

Figure 2B:
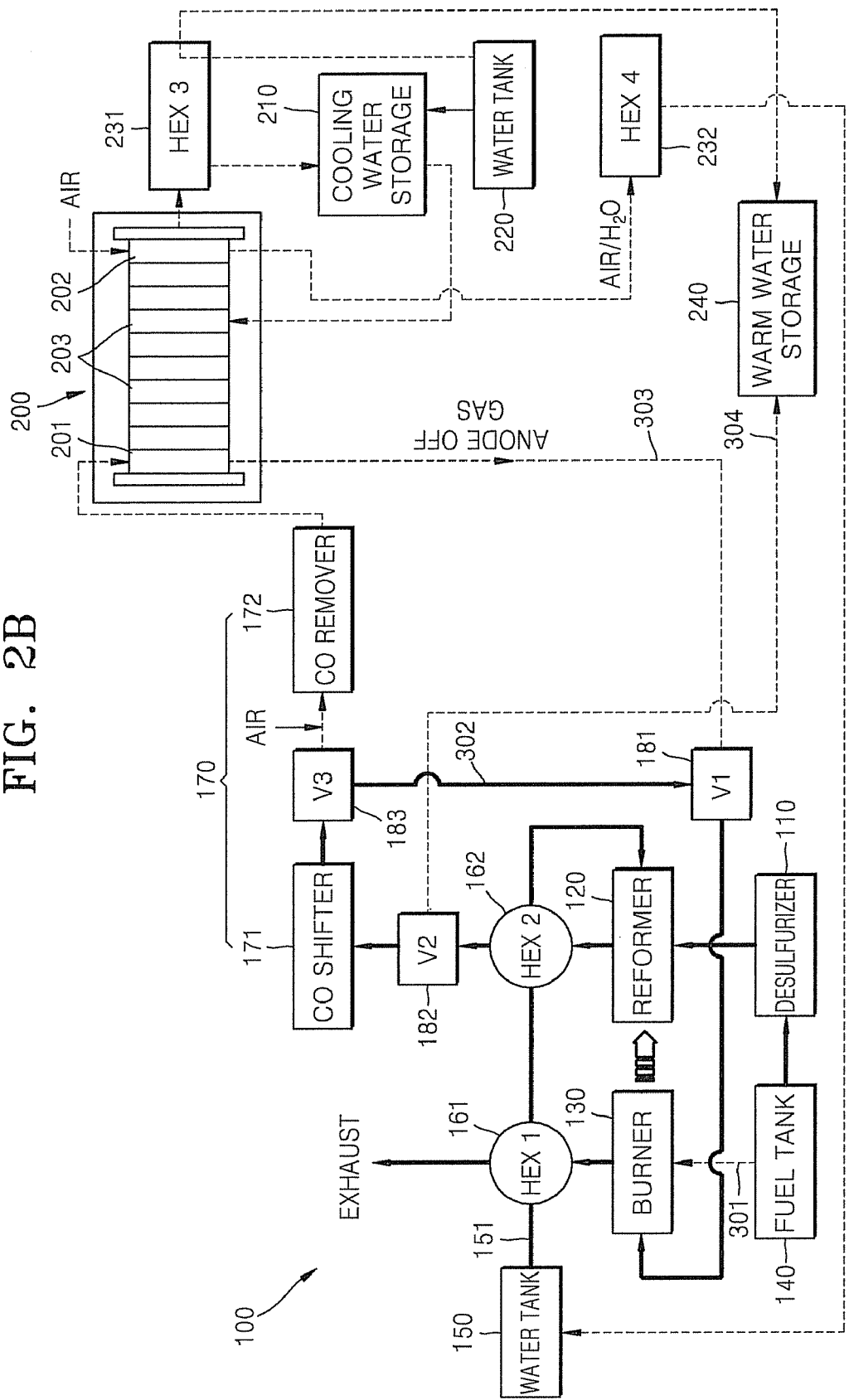

At this point, the second valve 182 closes the warm water conveying line 304, and opens a path to the CO shifter 171, to allow the reformed gas to be transferred from the reformer 120 to the CO shifter 171. However, at an early stage of operation, the CO remover unit 170 cannot sufficiently remove CO from the reformed gas. In order to prevent electrodes in the stack 200 from being poisoned by the CO, the content of CO in the reformed gas, must be below about 10 ppm. For this purpose, the CO content at an outlet of the CO shifter 171 must be at least 1 vol %, or less. Until the CO content at the outlet of the CO shifter 171 is reduced to 1 vol %, or less, the reformed gas is not supplied to the stack 200. However, the reformed gas is supplied to the burner 130, through the second burner fuel supply line 302, from the CO shifter 171 (S5) (refer to FIG. 2B). The valve 183 is installed at the outlet of the CO shifter 171, to return the reformed gas to the burner 130. However, the valve 183 can also be installed at the outlet of the CO remover 172, to return the reformed gas to the burner 130.

Figure 2C:
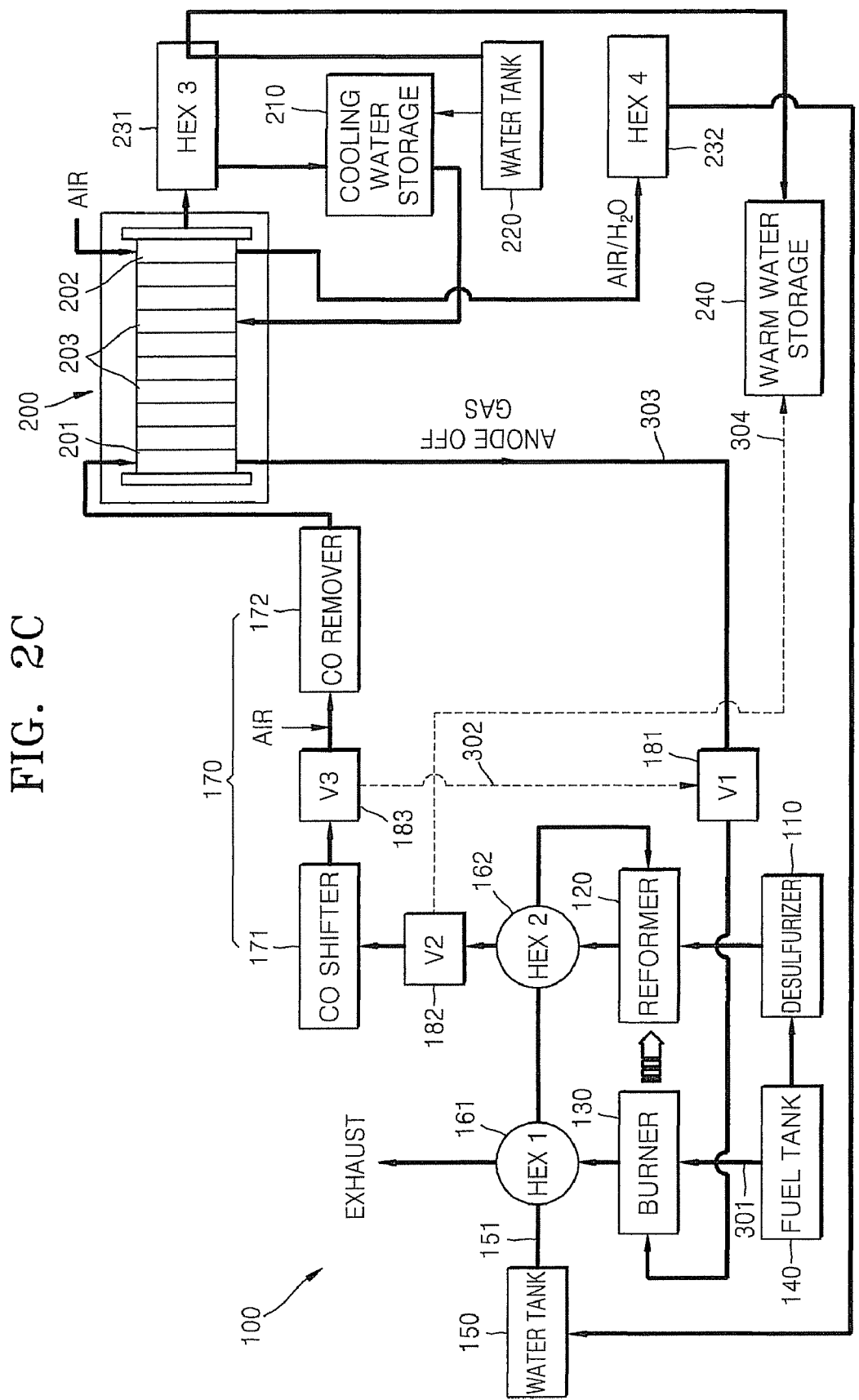

When the CO content at the outlet of the CO shifter 171 is reduced to 1 vol %, or less, (S6), the fuel cell system is switched to a normal operation mode and the reformed gas is supplied to the stack 200 (S7) (refer to FIG. 2C).

According to the configuration as described above, a fuel cell system that can be rapidly and smoothly operated and a method of operating the fuel cell system can be realized.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

What is claimed is:

1. A method of operating a fuel cell system comprising:
   heating a reformer using a burner;
   heating water in the reformer, once the reformer is heated to a first temperature;
   conveying the water heated by the reformer to a warm water storage, until the temperature of a CO shifter of a CO remover unit connected to the reformer reaches a second temperature;
   supplying a fuel source to the reformer to produce a reformed gas, once the CO shifter of the CO remover unit reaches the second temperature;
   supplying the reformed gas that has passed from the reformer through the CO shifter of the CO remover unit, to the burner, when the CO content of the reformed gas at an outlet of the CO shifter is greater than a set amount; and
   supplying the reformed gas from the CO remover unit to a stack, when the CO content of the reformed gas at the outlet of the CO shifter is reduced to the set amount, or less.

2. The method of claim 1, further comprising supplying an off-gas from the stack to the burner, after the reformed gas is supplied to the stack.

3. The method of claim 1, wherein the first temperature is about 500° C., the second temperature is equal to or higher than 80° C., and the set amount of the CO content is about 1 vol %.

* * * * *